United States Patent [19]
Cole

[11] Patent Number: 4,581,640
[45] Date of Patent: Apr. 8, 1986

[54] TELEVISION TRANSMISSION SYSTEM

[75] Inventor: Bernard V. Cole, St. Albans, England

[73] Assignee: U.S. Philips Corporation, New York, N.Y.

[21] Appl. No.: 555,848

[22] Filed: Nov. 28, 1983

[30] Foreign Application Priority Data

Dec. 22, 1982 [GB] United Kingdom ............. 8236370

[51] Int. Cl.$^4$ .................. H04N 7/04; H04N 11/06
[52] U.S. Cl. ................................ 358/141; 358/12
[58] Field of Search ............. 358/141, 142, 87, 214, 358/11, 12

[56] References Cited

U.S. PATENT DOCUMENTS 4,485,401  11/1984  Tan et al. ........................ 358/141
4,513,324  4/1985  Poetsch et al. .................. 358/214

OTHER PUBLICATIONS

R. N. Jackson and S. L. Tan, "Systems Concepts in High Fidelity Television", Institute of Electrical Engineers, 9/82, pp. 135-139.

Primary Examiner—Tommy P. Chin
Assistant Examiner—David E. Harvey
Attorney, Agent, or Firm—Thomas A. Briody; William J. Streeter; Edward W. Goodman

[57] ABSTRACT

In a wide picture format television transmission system, the signals for the scene (1, 2, 3, 4) are transmitted as first and second television signals. The first television signal contains signal information relating to a portion (1, 5, 2, 6) of the scene of a standard aspect ratio while the second television signal contains signal information relating to the remaining portions (1, 2, 3, 5 and 1, 6, 3, 4) of the scene. The first television signal can be compatible with television signals currently broadcast. In order to enable the first television signal to relate to the area of main interest of the scene, it may be derived from a moveable portion between extreme portions of the scene. In order to correctly combine the information from the first and second television signals at a receiver for a correct wide picture format display, the second television signal additionally comprises a component in the form of a steering pulse.

11 Claims, 11 Drawing Figures

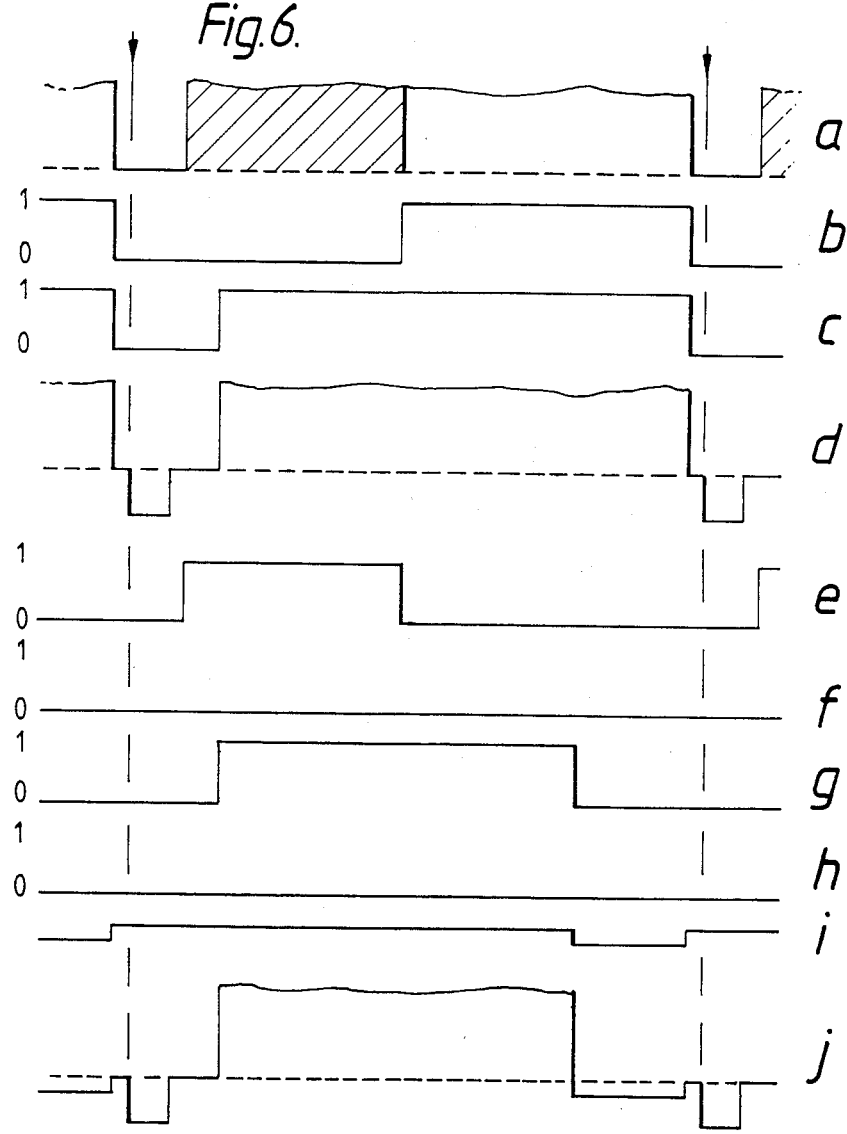

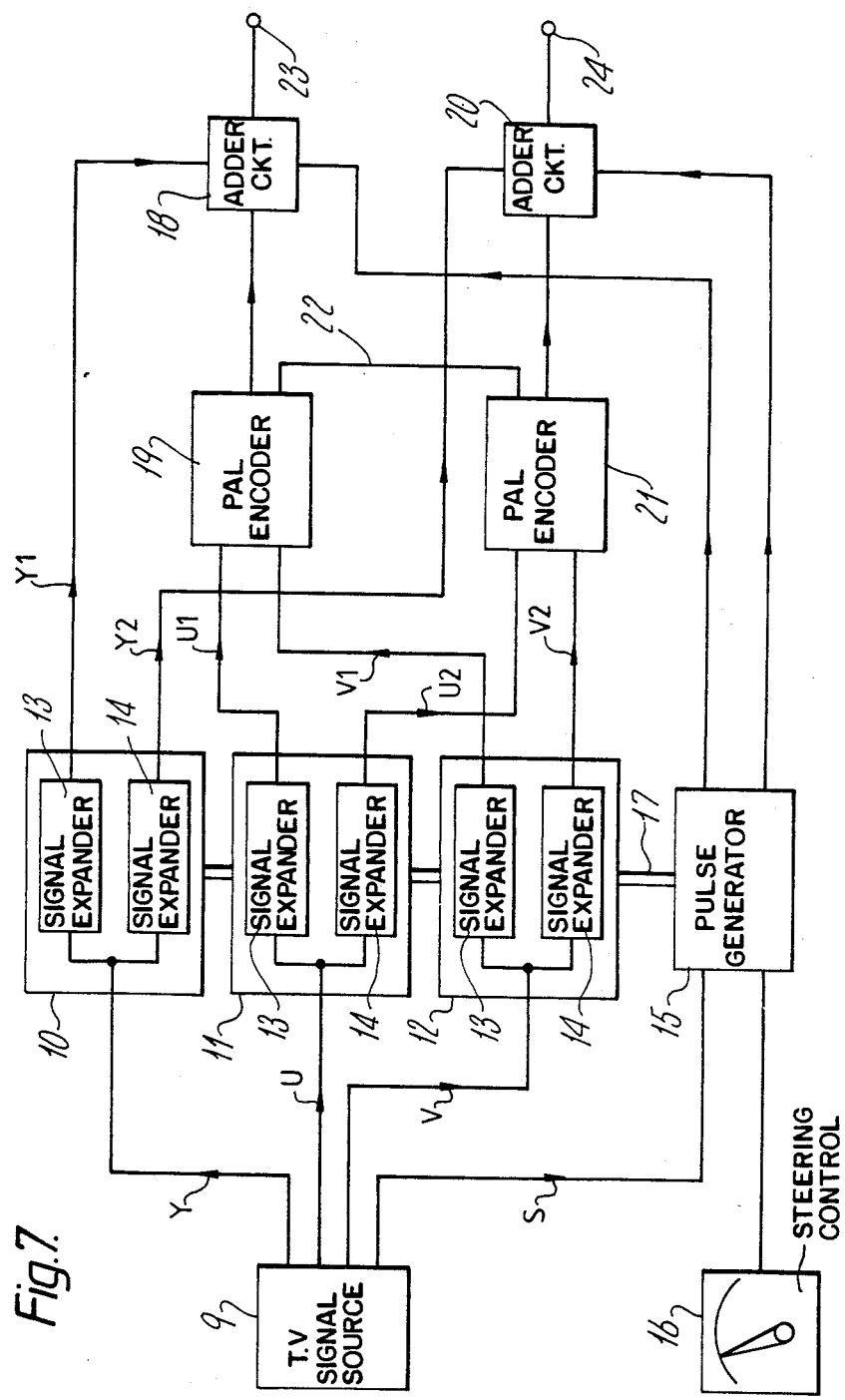

TELEVISION TRANSMISSION SYSTEM

BACKGROUND OF THE INVENTION

The invention relates to a television transmission system for the simultaneous transmission of television signals from the same scene for standard and wide picture formats of, respectively, a standard aspect ratio and a wider than standard aspect ratio, with both picture formats having the same height, in which a first television signal, containing information for the production of a display of the standard picture format, is transmitted by way of a first transmission path while a second television signal, containing the additional information required to be added to that of said first television signal for the production of a display of the wide picture format, is transmitted by way of a second transmission path. The invention also relates to television transmission and reception equipment for use with such a system.

Such a television transmission system is known from IBC 82 International Broadcasting Convention, "Systems concepts in high fidelity television" by R. N. Jackson and S. L. Tan, pages 135 to 139, published by the Institute of Electrical Engineers in September 1982. FIG. 2 of that paper and the accompanying text relate to a two channel television transmission system where one channel carries the information for a 4:3 aspect ratio picture format conventional signal while the second channel carries all the information relating to the wide format display additions. In this way the first channel signal may be received alone for the production of a display of 4:3 (standard) aspect ratio while the signals from both channels may be received together for the production of a wide screen display. The rigid division of the portions of the display as shown in the mentioned FIG. 2 may not always produce a picture of greatest interest when the first channel signal is reproduced alone.

SUMMARY OF THE INVENTION

It is an object of the invention to provide such a compatible television transmission system capable of producing a picture of greatest interest when the first channel signal is reproduced alone.

The present invention provides a television transmission system for the simultaneous transmission of television signals from the same scene for standard and wide picture formats of, respectively, a standard aspect ratio and a wider than standard aspect ratio with both picture formats having the same height, in which a first television signal, containing information for the production of a display with the standard picture format, is transmitted by way of a first transmission path, while a second television signal, containing the additional information required to be added to that of said first television signal for the production of a display with the wide picture format is transmitted by way of a second transmission path, characterized in that said first and second television signals are both derived from signal information relating to the full width of the scene, the information contained in the first television signal relating to a moveable selected portion of said scene while that contained in the second television signal relates to the remaining portion or portions of said scene, said second television signal additionally comprising a component for indicating the correct position of the information contained in the second television signal in relation to that of the first television signal on the production of a display of the wide picture format.

With the invention, therefore, the area of main interest may always be present in the first television signal such that receivers displaying only that signal can provide the most interesting display from the wide picture format information.

The component may comprise a pulse located in the video signal of said second television signal, the position of said pulse in said video signal providing the indication. Where the second television signal, contains a synchronizing signal this pulse may have an amplitude which is less than half that of the synchronizing signal. The component may alternately comprise a pulse or pulses transmitted during the field blanking period of the second television signal.

From another aspect, the invention provides television transmission equipment for use with the above television transmission system comprising means for generating said first television signal from a scene having said wider than standard aspect ratio, said first television signal representing a portion of said scene having said standard aspect ratio, means for applying said first television signal to said first transmission path, means for generating said second television signal from said scene, said second television signal representing the information in said scene outside the portion of standard aspect ratio, means for applying said second television signal to said second transmission, characterized in that said equipment additionally comprises means for selecting said first television signal from a moveable portion of said scene within the width of said scene, and means for adding a component to said second television signal which component indicates the relative position of said moveable portion contained in said first television signal.

The position of the moveable portion may be determined by a steering control under the control of an operator, this steering control also determining the generation of the component added to the second television signal. This component may comprise a steering pulse located in the video signal of the second television signal, or a pulse or pulses located in the field blanking period of this television signal. A pulse generator which provides the synchronizing signal, for the second television signal may also provide the steering pulse or pulses for this television signal.

The invention additionally provides television reception equipment for use with the above television transmission system, comprising a first input terminal for receiving said first television signal present in said first transmission path, a second input terminal for receiving said second television signal present in said second transmission path, means for combining the video information contained in said first and second television signals for producing a wide picture format display representing the full width of said scene from which said first and second television signals are derived, characterized in that said equipment additionally comprises means responsive to said component present in said second television signal for combining the video information contained in said first and second television signals with the correct relationship for the production of said wide picture format display.

A pulse generator responsive to synchronizing signals present in said first and/or second television signals, may also be responsive to a steering pulse forming the component in the second television signal, the pulse generator producing control pulses required for controlling the correct combining of the video information in the first and second television signals for the production of the wide picture format display.

DESCRIPTION OF THE DRAWINGS

The above and other features of the invention will now be described, by way of example, with reference to the accompanying drawings in which:

FIGS. 1, 2 and 3 are diagrams of displays produced by the television transmission system according to the invention;

FIGS. 4, 5 and 6 are waveforms used to describe the television transmission system according to the invention;

FIG. 7 is a block diagram of television transmission equipment for use with the present invention;

DESCRIPTION OF THE PREFERRED EMBODIMENT

Figure 1:
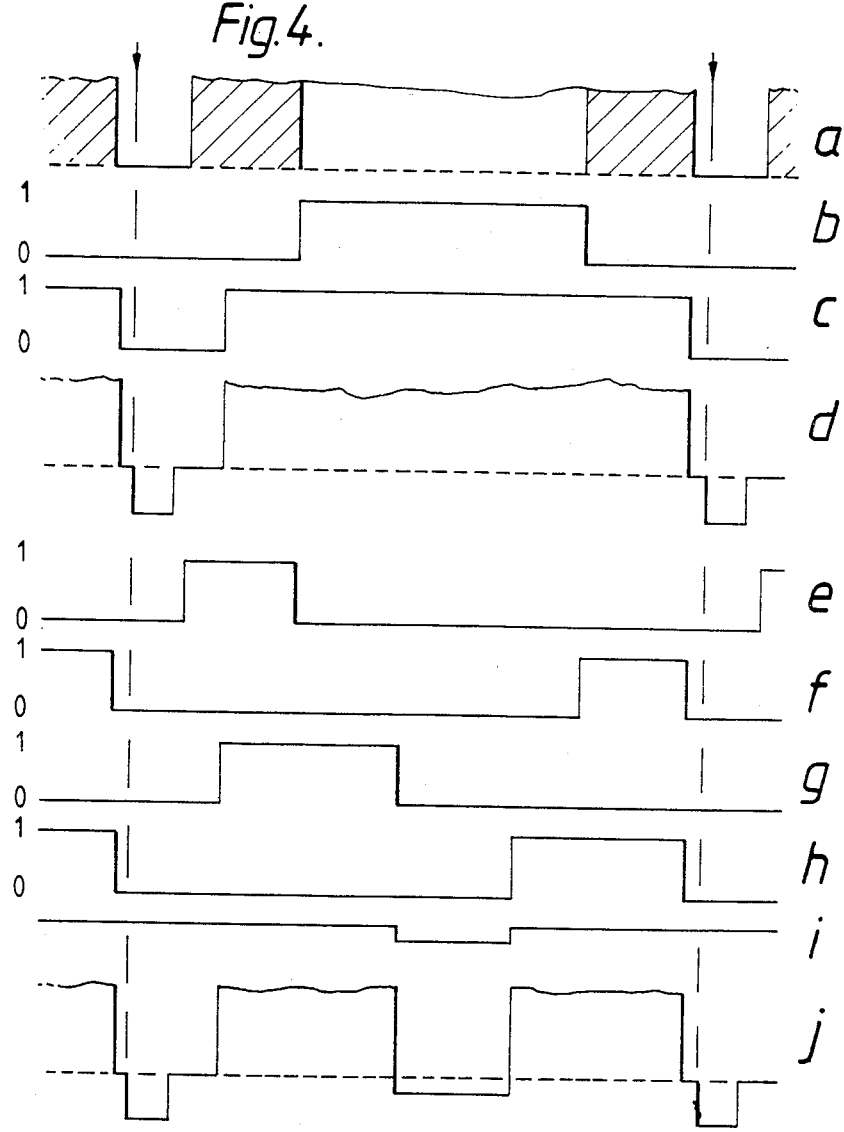
Figure 2:
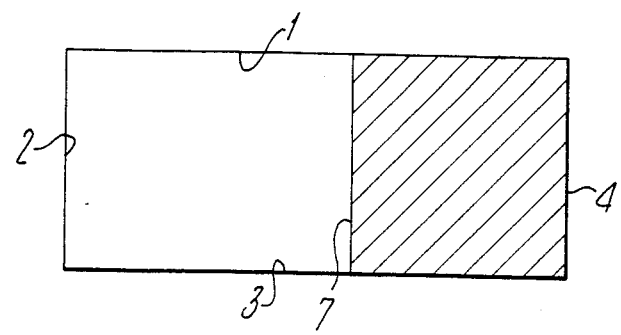

FIG. 1 represents the display format of a wide screen television display which corresponds with FIG. 2 of the paper mentioned above as presented at the 1982 International Broadcast Convention. The whole picture format bounded by the lines 1, 2, 3 and 4 represents a display having an aspect ratio of 7:3 while the area bounded at its sides by the lines 5 and 6 represents that portion of the display having an aspect ratio of 4:3. The aspect ratio of 4:3 is the standard aspect ratio for television displays from most currently transmitted television signals and a first television signal corresponding to the information for the display portion with the 4:3 aspect ratio can be transmitted over a first television transmission path or channel as proposed in the above paper such that this transmission is compatible with normal transmissions for pictures with the same aspect ratio. Such a transmission may then be received and displayed by conventional television receivers suited for displays of that aspect ratio. The shaded areas to the left and to the right of the lines 5 and 6, respectively, represent the portions for which additional picture information is transmitted as a second television signal over a second television transmission path or channel also as suggested in the above paper. This second television signal would contain all the information relating to those portions of the wide screen display which is needed to be added to that of the first television signal to produce such a display.

Transmissions to produce the display of FIG. 1 are inflexible in that the area of main interest may not always be contained within the portion having the 4:3 aspect ratio lying in the middle of the display and it is desirable to be able to steer that portion of the display such that the area of main interest always lies within the picture portion of 4:3 aspect ratio. FIG. 2 represents a similar display to that of FIG. 1 where the main area of interest lies on the left-hand side of the picture. The 7:3 aspect ratio display is again indicated by the lines 1, 2, 3 and 4 while the portion of 4:3 aspect ratio lies between the line 2 and a further line 7. With a display of the type in FIG. 2, the first transmission again contains the first television signal relating to the portion of 4:3 aspect ratio while the information relating to the shaded portion to the right of the display is contained in the second television signal.

A similar situation arises with FIG. 3 where the 7:3 aspect ratio display is again indicated by the lines 1, 2, 3 and 4 and the area of main interest lies to the right of the picture. The 4:3 aspect ratio display portion then lies between the line 4 and a further line 8, information for this portion being transmitted by way of the first television signal over the first transmission path. The additional information for the shaded portion of the display on the left side of FIG. 3 is transmitted by way of the second television signal over the second transmission path.

From FIGS. 1, 2 and 3 it will be appreciated that standard television receivers only suited for displaying pictures of aspect ratio 4:3 from standard television transmissions would display the area of main interest and it will be appreciated that the 4:3 aspect ratio portion may be located at any position across the display between the extremes shown in FIG. 2 or 3.

Figure 5:
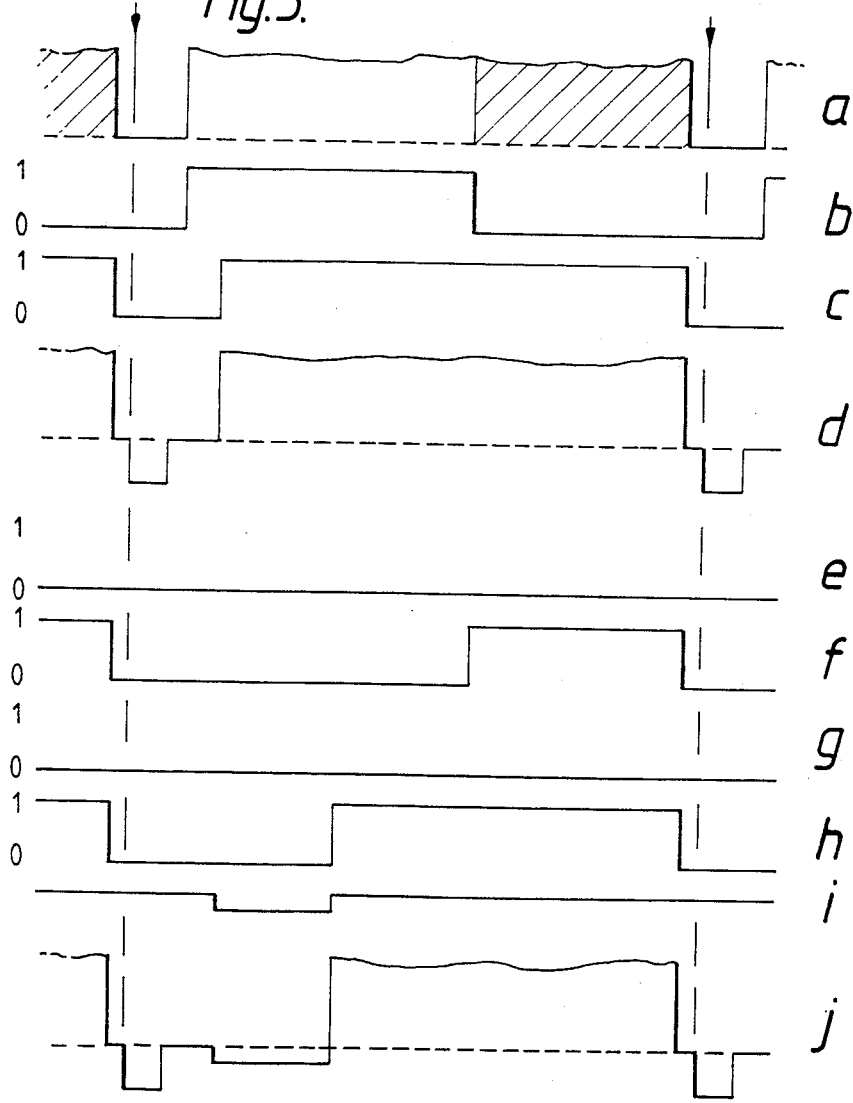

To achieve a two channel transmission system where the area of main interest may be steered as described above, the second television signal comprises, in accordance with the invention, a component for indicating the correct position of the information contained in the second television signal in relation to that contained in the first television signal so that on the display of a receiver for the wide picture format, the displayed portions are correctly positioned. One way in which this may be achieved will be described in relation to the waveforms in FIGS. 4, 5 and 6 which correspond with and are shown immediately below the display format of FIGS. 1, 2 and 3, respectively. In this description, it will be assumed that the television signals contain 625 lines per frame with two fields per frame and 25 frames per second as per C.C.I.R. systems, each line occupying a period of 64 μs. The first television signal will then be a standard C.C.I.R. signal, a line period of which may be as shown in FIG. 1 on page 3 of "Specification of television standards for 625-line system-I transmissions" published jointly by the British Broadcasting Corporation and the Independent Television Authority, January 1971 which is incorporated herein by way of reference. It is to be realized that the invention is not limited to use with such systems.

FIGS. 4a, 5a and 6a each show a video (luminance or RGB) signal generated for the scenes represented by the picture formats of FIGS. 1, 2 and 3, respectively. The start and end of a line period (the line reference points) are indicated by the arrows which also relate to corresponding times in the other waveforms. As the aspect ratio of the total picture and hence of the scene is considered to be 7:3, it will be appreciated that in the horizontal direction the signal must contain more information than for a scene of 4:3 aspect ratio. For this reason the video content of the signal is considered to occupy 56 μs of each line period (between 6 and 62 μs) rather than the usual 52 μs, any synchronizing signal having been omitted for convenience. In these video signals, the portion of each signal corresponding to the selected portion of 4:3 aspect ratio of the scene is shown without shading while the shaded portion or portions represent the additional portion or portions of the scene. It is the unshaded portion of each video signal which is used to produce the first television signal while the shaded portion or portions is/are used to produce the second television signal.

The unshaded portion of the video signal in FIGS. 4a, 5a or 6a is separated from the remainder of the signal during the period when FIGS. 4b, 5b or 6b is in the '1' condition. In each case this produces a signal occupying 32 μs which is subjected to signal expansion (×1.625) such that it occupies the period of 52 μs during which FIGS. 4c, 5c or 6c is in the '1' condition. If the position of this period is compared with FIG. 1 of the above mentioned specification of television standards, then it will be seen that the period corresponds to the normal vision signal portion of a television line (between approximately 10.5 to 63.5 μs) and the resulting expanded video signal is shown in FIGS. 4d, 5d or 6d (to which the line synchronising pulse has been added). This signal of FIGS. 4d, 5d or 6d is therefore the first television signal which corresponds to a conventional television signal relating to a standard picture format (4:3 aspect ratio). Although the signals of FIGS. 4d, 5d and 6d appear to all purposes, to be similar, it will be realized for each of these figures, that the signal is derived from a different portion of the scene as represented in FIGS. 1, 2 and 3, respectively.

The shaded portion or portions of the video signal in FIGS. 4a, 5a or 6a is/are separated from the remainder of the signal during the period in which the signals in FIGS. 4e, 4f, 5e, 5f, 6e and 6f are in the '1' condition. The period associated with FIGS. 4e, 5e and 6e is associated with the shaded portion of the video signal corresponding to the left-hand side of the scene while the period associated with FIGS. 4f, 5f and 6f is associated with the shaded portion of the video signal corresponding to the right-hand side of the scene. It will be seen from FIGS. 5e and 6f that there is obviously no signal separation when there is an absence of a shaded signal portion for the left or right-hand side of the scene. The resulting separated signals are then subjected to signal expansion at the same previous rate (×1.625) such that the signals during the appropriate periods in FIGS. 4e, 4f, 5e, 5f, 6e and 6f are expanded to occupy the respective periods in FIGS. 4g, 4h, 5g, 5h, 6g and 6h when in the '1' condition. (In fact, in the case of FIGS. 5h and 6h, there will be no expansion for obvious reasons.) For FIGS. 4g and 6g expansion commences at 10.5 μs after the line reference point and for FIGS. 4h and 5h expansion ends at 62.5 μs after the line reference point. From FIGS. 4g, 4h, 5g, 5h, 6g and 6h, it will be appreciated that the expanded signals will occupy a total of 39 μs out of the 52 μs available thus leaving a space of 13 μs at some time during each line period. This 13 μs space is located either between the expanded signals (FIGS. 4g and 5h) or before or after the expanded signal (FIG. 4h or 6g) and thus this space indicates the relative positions of the various portions in the scene and in the subsequent display. During this space, therefore, a steering pulse is generated of 13 μs duration shown to be negative going in FIGS. 4i, 5i or 6i. The resulting expanded signals and the steering pulse are added together with a conventional synchronizing signal and the resulting composite signals are shown in FIGS. 4j, 5j and 6j, each of which forms the second television signal. From these figures it will be seen that the steering pulse lies below the black level of the signal (shown dotted in the waveforms) and is approximately one third the amplitude of the line sync. signal. This amplitude is chosen such that suitable television receivers can differentiate between it and the line sync. pulse which are normally detected at their half amplitude level, the length of the steering pulse also being considerably longer than that of the line sync. pulse.

Television transmission equipment which may be used to produce the signals for the above television transmission system, will now be described in relation to the block diagram of FIG. 7. In FIG. 7, a source 9 of television signals for a scene having the above wide picture format of 7:3 aspect ratio, provides a luminance signal Y and blue and red color difference signals U and V together with a synchronizing signal S. The source 9 may be a television camera suited to produce the required wide picture format signals or may be a video recorder for which suitable recordings would be available. No details of the synchronizing signal S are given as these are not essential for an understanding of the invention but it would not be of exactly the same form as currently present in broadcast television transmissions. The luminance Y and color difference signals U and V are each of the form shown in FIGS. 4a, 5a or 6a depending on the positioning of the area of main interest and are applied to respective signal processors 10, 11 and 12 each comprising a first 13 and a second 14 signal expander each receiving the signal applied to its associated signal processor. The synchronizing signal S is applied to a pulse generator 15 to which a steering control 16 is also connected. Under the control of an operator, the steering control 16 is adjusted to select the area of main interest in the scene, i.e. the area or portion of 4:3 aspect ratio, which, in turn, controls the generation of the necessary control pulses needed to be applied to the signal processors 10, 11 and 12 to obtain the required signals for the two transmissions. The thickened connection 17 is assumed to convey the necessary connections for the control pulses to the signal processors. Each first signal expander 13 selects the unshaded portion of the applied video signal (FIGS. 4a, 5a or 6a) and expands it (×1.625) to occupy the period indicated in FIGS. 4c, 5c or 6c to produce the video signal shown in FIGS. 4d, 5d or 6d. The resulting luminance signal from the first signal expander 13 of processor 10, indicated by Y1, is applied to a first input of a first adder circuit 18 while the corresponding color difference signals from processors 11 and 12 and respectively indicated by U1 and V1, are applied to respective first and second inputs of a first PAL encoder circuit 19. Each second signal expander 14 selects the shaded portion or portions of the applied video signal (FIGS. 4a, 5a or 6a) and expand(s) it or these (×1.625) to occupy the relevant periods indicated in FIGS. 4g, 4h, 5g, 5h, 6g or 6h to produce the video signal portions shown in FIGS. 4j, 5j or 6j. The resulting luminance signal from the second signal expander 14 in the processor 10 indicated by Y2 is applied to a first input of a second adder circuit 20 while the corresponding color difference signals from processors 11 and 12, respectively, indicated by U2 and V2, are applied to respective first and second inputs of a second PAL encoder circuit 21. It will be noted that a connection 22 is present between the two PAL encoder circuits 19 and 21 which ensures the required phase relationship between the subcarrier present in each encoder circuit. The encoded outputs of the PAL encoder circuits 19 and 21 are applied to the second inputs of the first and second adder circuits 18 and 20, respectively, while third inputs of these adder circuits receive the necessary synchronizing signals from the pulse generator 15. In the case of the synchronizing signal applied to adder circuit 20, this will also contain the steering pulse (FIGS. 4i, 5i or 6i) whose position is controlled by steering control 16.

The output of the first adder circuit 18 is applied to a first output terminal 23 for application to the first transmission path, the output signal being the first television signal in the form of that present in FIGS. 4d, 5d or 6d. The second adder circuit 20 output is applied to a second output terminal 24 for application to the second transmission path, this output signal being the second television signal in the form of that present in FIGS. 4j, 5j or 6j. The first and second transmission paths may be separate video recorders or separate tracks on a recorder or separate transmission channels in the UHF or even higher frequency bands. Alternatively, it is possible for the transmission paths to form the respective upper and lower sidebands of a broadcast transmission. Although the signal at output terminal 23 is required to be a conventional broadcast television signal, this is not necessary for the signal at terminal 24 which may be transmitted in any convenient form which may not in itself be compatible with normal television signals.

Figure 8:
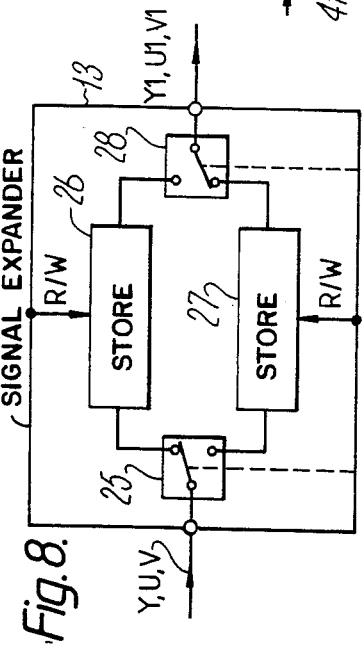
FIGS. 8 and 9 are block diagrams of signal expanders used with the equipment of FIG. 8.

FIG. 8 is a block diagram of the first signal expander 13 and comprises a first changeover switch 25, the moving contact of which is connected to the expander input which carries the luminance Y or color difference signals U or V. The upper stationary contact of switch 25 is connected to the input of a first store 26 while the lower stationary contact of the switch 25 is connected to the output of a similar second store 27. The outputs of the stores 26 and 27 are respectively connected to the upper and lower stationary contacts of a second changeover switch 28, the moving contact of which forms the output of the signal expander carrying the luminance signal Y1 or the chrominance signal U1 or V1. Each of the stores 26 and 27 is controlled at a read/write input R/W from the pulse generator 15 over the connection 17 (FIG. 7) as are the moving contacts of switches 25 and 28. In operation, the appropriate input signal (FIGS. 4a, 5a or 6a) is applied, alternately line-by-line, to the input of either store 26 or store 27 by means of switch 25 whose moving contact is operated at half-line frequency. With this moving contact in the position shown, the appropriate part of a line is written, at a given rate, into store 26 when FIGS. 4b, 5b or 6b is in the '1' condition. During the same line period, the signal previously written into store 27 is read out at a slower rate when FIGS. 4c, 5c or 6c is in the '1' condition, and with the moving contact of switch 28 in the position shown, the expanded video signal of FIGS. 4d, 5d or 6d is present at the output of the expander 13. During successive line periods the write/read cycle is continually changed between the two stores 26 and 27.

Figure 9:
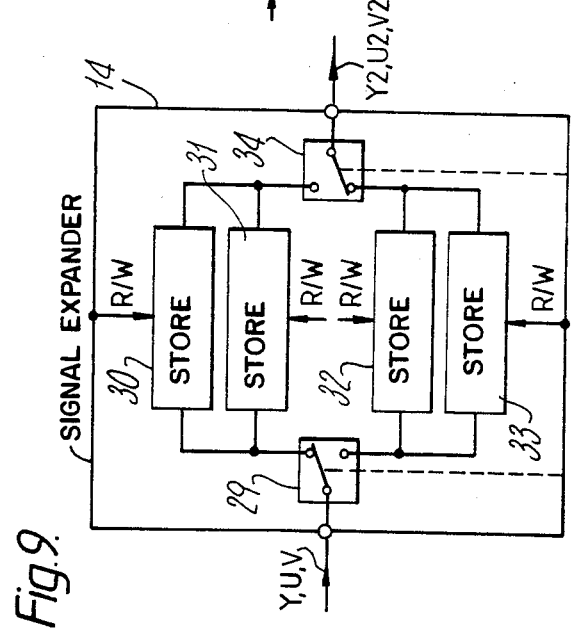

FIG. 9 is a block diagram of the second signal expander 14 and comprises a first changeover switch 29, the moving contact of which is connected to the expander input carrying the luminance Y or chrominance U and V signals. The upper stationary contact of switch 29 is connected as shown to the inputs of first and second stores 30 and 31, while the lower stationary contact of the switch 29 is connected as shown to the inputs of third and fourth stores 32 and 33. The outputs of stores 30 and 31 are both connected to the upper stationary contact of a second changeover switch 34 while the outputs of the stores 32 and 33 are connected to the lower stationary contact of switch 34, the moving contact of which forms the output of expander 14 carrying the luminance Y2 or chrominance U2, V2 signals. It will be seen that expander 14 is similar to expander 13 save that the store in each path is duplicated, the switches 29 and 34 being operated at half-line frequency to apply lines of the incoming video signal (FIGS. 4a, 5a or 6a) alternately to the inputs of stores 30 and 31 and then to stores 32 and 33. Each store is provided with a read/write input R/W controlled, as in FIG. 8, from the pulse generator 15 over the connection 17 (FIG. 7). With the moving contact of switch 29 in the position shown in FIG. 9, the appropriate video signal is written in at a given rate to store 30 during the period when FIGS. 4e, 5e or 6e is in the '1' condition and into store 31 at the same rate during the period when FIGS. 4f, 5f or 6f is in the '1' condition. During the same line period, the signal previously stored in store 32 is read out at a slower rate during the period when FIGS. 4g, 5g or 6g is in the '1' condition, while that previously stored in store 33 is read out at the same rate during the period when FIGS. 4h, 5h or 6h is in the '1' condition, the read out signal being applied through switch 34 with its moving contact in the position shown to the output of the expander 14. At the end of each line period, the position of the moving contacts of switches 29 and 34 changes and the read/write operation of the stores interchanged. In this way, the video signal of FIGS. 4j, 5j or 6j is produced from the signal of FIGS. 4a, 5a or 6a.

Figure 11:
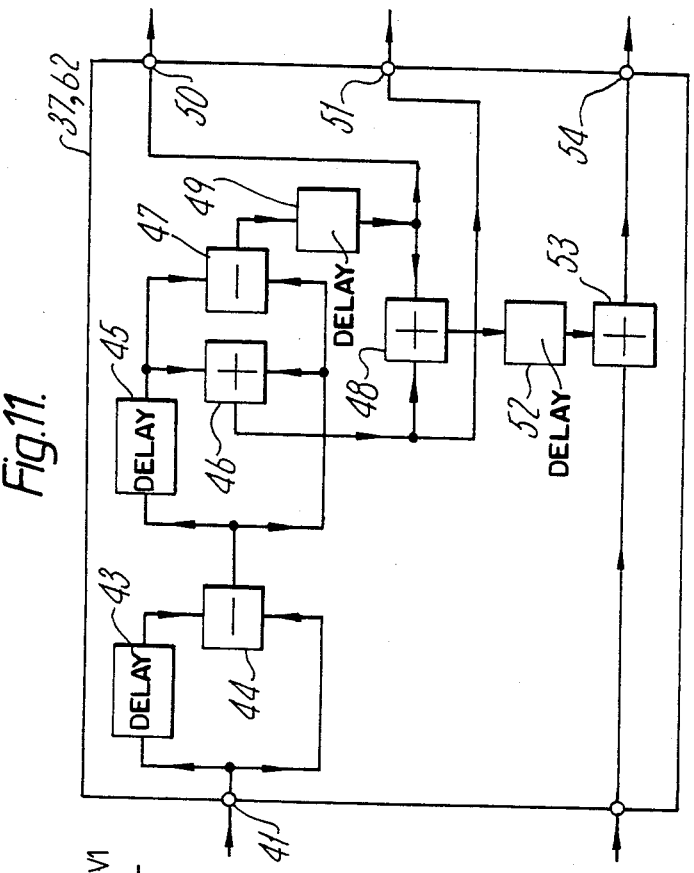
FIG. 11 is a block diagram of a comb filter for use with the equipment of FIG. 10.
Figure 10:
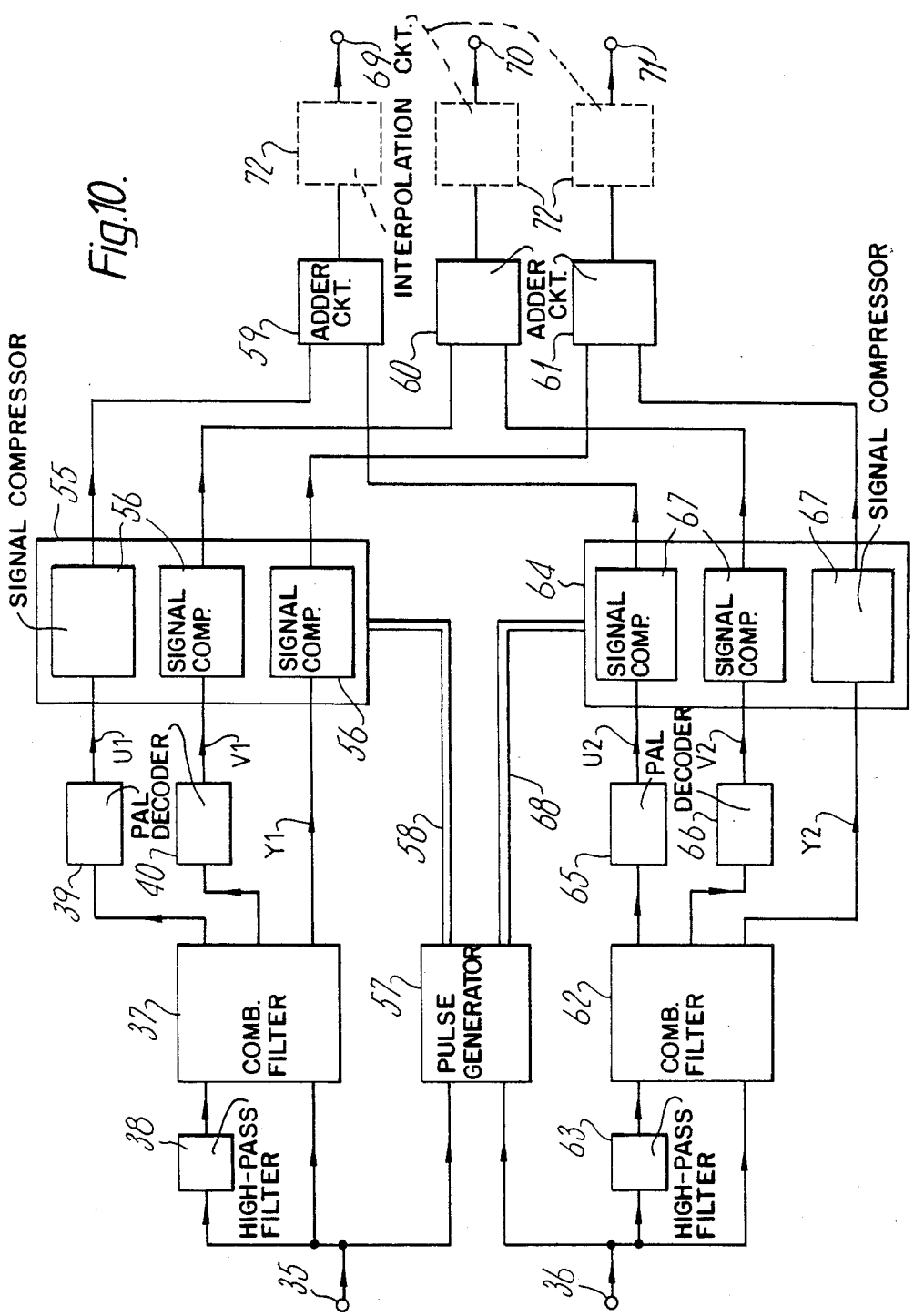
FIG. 10 is a block diagram of television reception equipment for use with the present invention.

FIG. 10 is a block diagram of television reception equipment for the present television transmission system. In FIG. 10, a first input terminal 35 receives the first television signal from the first transmission path while a second input terminal 36 receives the second television signal from the second transmission path. In the case where these signals are transmitted by way of carriers, it is assumed that the necessary demodulation takes place prior to terminals 35 and 36. The first television signal (FIGS. 4d, 5d or 6d) is applied from terminal 35 to a first input of a comb filter 37 by way of a high-pass filter 38 having a cut-off frequency of 3 MHz, so that this first input only receives the luminance signal above 3 MHz and the subcarrier modulated by the color difference signals. A second input of the comb filter 37 receives the incoming signal direct from input terminal 35 comprising the whole of the luminance and the modulated subcarrier. The comb filter 37 separates the incoming luminance and color difference modulated signals to produce the luminance signal Y1 and, after modulation in respective PAL decoder circuits 39 and 40, the chrominance signals U1 and V1 respectively are produced. The comb filter 30 may take one of a number of known forms, a suitable filter being that shown in FIG. 4.6 on page 169 of Colour Television, Vol. 2 mentioned above. For the sake of showing additional connections, the construction of that comb filter is redrawn in FIG. 11 where inputs 41 and 42 are, respectively, connected to the high-pass filter 38 and directly to input terminal 35. Input 41 is connected through a 64 μs delay circuit 43 to a first input of a difference circuit 44 whose second input is directly connected to input 41. The output of difference circuit 44 is connected through a delay circuit 45 providing a delay of 63.943 μs to the first input of respective adder 46 and difference 47 circuits, the second input of these two circuits 46, 47 being directly connected to the output of difference circuit 44. The output of the adder circuit 46 is connected to a first input of a further adder circuit 48 while the output of the difference circuit 47 is connected through a 57 ns delay circuit 49 to the second input of the adder circuit 48. The output of delay circuit 49 is also connected to an output 50 of the comb filter at which the U component modulated on the subcarrier appears, while the output of the adder circuit 46 is also applied to an output 51 of the comb filter at which the V component modulated on the subcarrier also appears. The output of the adder circuit 48, which comprises the combination of the quadrature related subcarrier signals, is applied through a 28.5 ns delay circuit 52 to a first input of a further adder circuit 53. The second input of the adder circuit 53 is directly connected to the input 42 and so receives the full luminance and modulated subcarrier signals, these modulated subcarrier signals being of opposite phase to those appearing at the first input of this adder circuit. The output of the adder circuit 53 is connected to an output 54 of the comb filter at which the luminance signal appears substantially free from subcarrier components. The luminance signal Y1 and the decoded chrominance U1 and V1 signals are applied to respective inputs of a signal processor 55 having three respective similar signal compressors 56 each of which have the same construction as that shown in FIG. 8. The operation of the compressors 56 differs from that described in relation to FIG. 8 in that the appropriate applied signal is written into the appropriate store when FIGS. 4c, 5c or 6c is in the '1' condition at the slower rate, and subsequently read-out of that store when FIGS. 4b, 5b or 6b is in the '1' condition at the given rate. The incoming signals at input terminals 35 and 36 are also applied to a pulse generator 57 controlled by the incoming synchronizing signals and (in the case of the second television signal) the steering signal. The pulse generator 57 generates the necessary pulses to control the compressors 56 which are assumed to be applied over the thickened connection 58. The outputs of signal processor 55 are the luminance and chrominance portions of the signal shown unshaded in FIGS. 4a, 5a or 6a which are applied to the first inputs of respective adder circuits 59, 60 and 61.

The second television signal (FIGS. 4j, 5j or 6j) is applied from terminal 36 to the first input of a second comb filter 62 by way of a high-pass filter 63 with a cut-off frequency of 3 MHz, while the second television signal is applied direct to a second input terminal of comb filter 62. This comb filter 62 is of the same construction and operation as that described above in relation to FIG. 11 and provides separated luminance and color difference signals at its output. The luminance signal Y2 is applied direct to a second signal processor 64, while the color difference signals are applied to PAL decoder circuits 65 and 66 to produce the respective chrominance signals U2 and V2, which are also applied to the second signal processor 64. This signal processor 64 contains three similar signal compressors 67 to which the three incoming signals are applied, each compressor being of the same construction as the expander shown in FIG. 9, but differs in operation in that write-in to the appropriate store are at the slower rate during the periods when FIGS. 4g, 5g or 6g and FIGS. 4h, 5h or 6h are in their '1' condition, while read-out takes place at the given rate from the appropriate store during the periods when FIGS. 4e, 5e, or 6e and FIGS. 4f, 5f or 6f are in their '1' condition. As with signal compressors 56, the necessary pulses required for controlling their operation are provided by pulse generator 57 and are assumed to be applied to signal processor 64 over the thickened connection 68. The outputs of the signal processor 64 are the luminance and chrominance portion or portions of the signal shown shaded in FIGS. 4a, 5a or 6a which are appropriately applied to the second input of adder circuits 59, 60 and 61.

The added outputs of the adder circuits 59, 60 and 61 provide the U and V chrominance signals and the luminance signal Y, respectively, to output terminals 69, 70 and 71 each of which take the form of the signal shown in FIGS. 4a, 5a or 6a. The signals present at these terminals, if desired, subjected to interpolation in interpolator circuits 72, can be applied to a wide screen color display either of the direct view or projection type.

With the above described system and equipment, changes in the portion of the standard format portion should only take place between discrete fields to avoid any discontinuity in the displayed picture. For this reason, the steering signal need only be transmitted at field rate and could then take the form of a pulse or pulses transmitted during the field blanking period of the second television signal.

While the invention has been described in relation to television signals using the PAL system, it will be realized that the system used could be of any known type. These may be of the frequency multiplexed type or might even be of the time multiplexed type such as described in U.S. Pat. No. 4 335 393 or as proposed by the Independent Broadcasting Authority in their MAC (Multiplexed Analogue Components) system.

I claim:

1. A method for simultaneously transmitting television signals depicting the same scene, for standard and wide picture formats of, respectively, a standard aspect ratio and a wider than standard aspect ratio with both picture formats having the same height, in which said method comprises transmitting, by way of a first transmission path, a first television signal containing information for the production of a display with the standard picture format, and transmitting, by way of a second transmission path, a second television signal containing additional information which, when combined with that of said first television signal, produces a display with the wide picture format, characterized in that said first and second television signals are both derived from signal information representing the full width of the scene, and said method further comprises deriving the information contained in the first television signal from a portion of said signal information representing a selected portion of said scene, deriving the information contained in the second television signal from a further portion of said signal information representing the remaining portion of said scene, generating a component for indicating the relative position of the information contained in the second television signal in relation to the selected portion of the first television signal on the production of a display of the wide picture format, and combining said component with said second television signal.

2. A method for simultaneously transmitting television signals as claimed in claim 1, characterized in that said component comprises a pulse located in the video signal of said second television signal, the position of said pulse in said video signal providing said indication.

3. A method for simultaneously transmitting television signals as claimed in claim 2 in which said second television signal contains a synchronizing signal, characterized in that said pulse has an amplitude which is less than half that of said synchronizing signal.

4. A method for simultaneously transmitting television signals as claimed in claim 1, characterized in that said method comprises transmitting said component, comprising at least one pulse, during the field blanking period of said second television signal.

5. Television transmission equipment for simultaneously transmitting television signals depicting the same scene, for standard and wide picture formats of, respectively, a standard aspect ratio and a wider than standard aspect ratio with both picture formats having the same height, said television transmitting equipment comprising means for generating a first television signal from signal information representing a scene having said wider than standard aspect ratio, said first television signal including a portion of said signal information representing a selected portion of said scene having said standard aspect ratio, means for applying said first television signal to a first transmission path, means for generating a second television signal from said signal information representing said scene, said second television signal including a further portion of said signal information representing a remaining portion of said scene outside the selected portion of standard aspect ratio, means for applying said second television signal to a second transmission path, characterized in that said television transmission equipment additional comprises means for selecting said selected portion of said scene within the width of said scene for said first television signal, means for generating a component indicating the relative position of said selected portion within the width of said scene contained in said first television signal, and means for adding said component to said second television signal.

6. Television transmission equipment as claimed in claim 5, characterized in that said selecting means and said component generating means comprise a steering control under the control of an operator for determining the position of said selected portion and for generating said component to be added to said second television signal.

7. Television transmission equipment as claimed in claim 6, characterized in that said component comprises a steering pulse located in the video signal of said second television signal, the position of said pulse in said video signal indicating the position of said selected portion.

8. Television transmission equipment as claimed in claim 6, characterized in that said component comprises at least one pulse located in the field blanking period of said second television signal which indicates the position of said selected portion.

9. Television transmission equipment as claimed in claim 7 or 8, in which a pulse generator provides the synchronizing signal present in said second television signal, characterized in that said steering control is coupled to said pulse generator for generating the steering pulse for said second television signal.

10. Television reception equipment for use with the television transmitting equipment as claimed in claim 5, 6, 7 or 8, comprising a first input terminal for receiving said first television signal present in said first transmission path, a second input terminal for receiving said second television signal present in said second transmission path, means for combining the video information contained in said first and second television signals for reconstructing said signal information representing said scene having said wider than standard aspect ratio, characterized in that said television reception equipment additionally comprises means for controlling said combining means in response to said component in said second television signal, whereby the information in said first television signal is in the same position of said scene, on display, as said selected portion, and the information in said second television signal is in the same position of said scene, on display, as said remaining portion.

11. Television reception equipment as claimed in claim 10, additionally comprising a pulse generator responsive to synchronizing signals present in said first and/or second television signals, characterized in that said pulse generator is also responsive to said component in said second television signal, said pulse generator producing control pulses for controlling the means for combining said video information in said first and second television signals for reconstructing said wide picture format display.

* * * * *